United States Patent [19]

Satkowski et al.

[11] Patent Number: 4,482,385
[45] Date of Patent: Nov. 13, 1984

[54] CEMENTITIOUS COMPOSITE MATERIAL WITH STAINLESS STEEL PARTICULATE FILLER

[75] Inventors: John A. Satkowski, Gaithersburg, Md.; Barry Scheetz, Lamont, Pa.; Janine M. Rizer, Waldorf, Md.; Carl Gotzmer, Accokeek, Md.

[73] Assignee: Research One Limited Partnership, Towson, Md.

[21] Appl. No.: 509,677

[22] Filed: Jun. 30, 1983

[51] Int. Cl.³ .............................................. C04B 31/18
[52] U.S. Cl. ........................................ 106/97; 106/98
[58] Field of Search ............................ 106/90, 97, 98

[56] References Cited

U.S. PATENT DOCUMENTS

| | | | |
|---|---|---|---|
| 4,050,949 | 9/1977 | Lundgren et al. | 106/97 |
| 4,118,242 | 10/1978 | Kjohl et al. | 106/98 |
| 4,310,486 | 1/1982 | Cornwell et al. | 106/98 |

*Primary Examiner*—James Poer
*Attorney, Agent, or Firm*—Lawrence I. Field

[57] ABSTRACT

A cementitious composite material exhibiting a unique combination of high strength, vacuum integrity and thermal properties. Objects made of the material may be cast from mixtures in which a major constituent is a filler which consists of stainless steel particles of particular shapes and sizes. The cast objects are characterized by the absence of a continuous network of interconnected pores and by the presence of a tobermorite phase in the material.

15 Claims, 5 Drawing Figures

TO VACUUM SYSTEM

TO VACUUM SYSTEM

CEMENTITIOUS COMPOSITE MATERIAL WITH STAINLESS STEEL PARTICULATE FILLER

This invention is directed to a new cementitious composite material exhibiting a unique combination of properties. More particularly, it relates to a composite with unusually high strength, vacuum integrity and thermal properties not found in previously known cementitious composite materials and which may be cast into objects in which such a combination of properties is desired.

One object of the invention is to provide a cementitious composition which is capable of sustaining a vacuum and which is therefore of particular utility when cast as an article intended to be used as a mold in a process involving the use of the mold in a vacuum environment.

A further object of the invention is to provide a cementitious composite material which comprises Portland cement and irregularly shaped stainless steel particles as the principal filler.

Another object of the invention is to provide a cementitious composite material which comprises Portland cement and irregularly shaped stainless steel particles as the principal filler and which is capable of holding a vacuum.

It has been found that the desired combination of properties is obtained from cement mixtures containing a tobermorite-like gel, and which are characterized by the absence of a continuous network of interconnected macroscopically visible pores.

The invention will be better understood from the description taken in conjunction with the drawings in which.

Figure 1:
FIG. 1 is a photograph of the irregularly shaped stainless steel particles present in the composite of the present invention.

In the description which follows, there is described one specific formulation of a material with a unique combination of properties, but it is to be understood that the present description is presented by way of illustration and is not intended to be construed as limiting the invention in any way.

Briefly, the invention is a composite material which is produced from a mixture including the following:
(a) Portland Cement (Preferably API Class H)
(b) Chemically Active Silica (Preferably tiny spherical particles of amorphous silica known as condensed silica fume)
(c) A Type F Superplasticizer (Preferably Sodium Salt of Formaldehyde Condensate of Naphthalene Beta Sulfonic Acid)
(d) An Antifoam Agent
(e) A Second Silica Filler
(f) A Metallic Filler (Preferably Stainless Steel)
(g) Water Each of the above will now be described in greater detail.

(a) The Portland Cement

While it appears that any of the various grades of Portland Cement which are commercially available are suitable for the production of the material of this invention, Type III Portland Cement is preferred and the Portland Cement known as API Class H is particularly preferred. Class H is the coarsest grind of Portland Cements. The Portland Cement component comprises between 20 and 33% by weight of the mixture, about 24.28% being particularly preferred.

(b) The Chemically Active Silica

The chemically active silica used in the mixture which produces the cementitious composite material of this invention is preferably an amorphous, non-crystalline, pozzolanic silicon dioxide and is preferably condensed silica fume.

This condensed silica fume is produced as a by-product in the electric arc furnace production of silicon or silicon alloys such as ferrosilicon. The gases which are evolved during the manufacture of ferrosilicon from quartz, coke and iron ore when they are heated to up to about 2000° C. contain Si and SiO vapors which form $SiO_2$ when they react with air as they emerge from the furnace. These vapors condense and the very tiny spherical particles which result from condensation of the vapors are almost entirely amorphous silica with 20–25 $m^2/g$ surface area. Typically, the particles analyze 85–92% $SiO_2$, up to 3% $Fe_2O_3$, 1–3% alkali metal oxides, 1–2% C, and the remainder being small amounts of alumina, lime and magnesia. The particles range from 0.01 to 0.3 micron with about 70% being smaller than 0.1 micron. This material is also described in U.S. Pat. No. 4,321,243 issued Mar. 23, 1982.

This constituent is believed to have pozzolanic properties in the present composition. Although in itself it possesses little or no cementitious value, it will, at ordinary temperatures, in the presence of moisture, chemically react with calcium compounds to form compounds possessing cementitious properties. Two such possible reactions involving the finely divided silica fume and leading to the production of tobermorite might be the following:

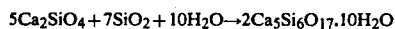

Furthermore, the use of silica fume in the mixture confers additional benefits. Because it is so finely divided, it helps to fill any interstital voids in the mixture and because it is chemically reactive it reacts with any $Ca(OH)_2$ present, or which forms from the hydrolysis of calcium silicates in the Portland Cement, and therefore counteracts the known deleterious effects which are produced when free $Ca(OH)_2$ or free CaO are present in cements.

The amount of condensed silica fume in the mixture should be between 2 and 7% by weight and 3.31% is a preferred amount.

(c) Superplasticizer

To make the final mixture more fluid and to permit better wetting and mixing, a plasticizer is included in the composition, the preferred plasticizer being sold as Mighty 100 or Mighty 150, the active ingredient of which is the sodium salt of formaldehyde condensate of naphthalene beta-sulfonic acid. Mighty 100 is available as a powder. Mighty 150 is available as a liquid. While it is not intended to be bound by any theoretical explanation, it is believed that the superplasticizer affects the zeta potential of the mixture and prevents flocculation. It also appears to increase the strength of the product by permitting the use of smaller amounts of water. Other known plasticizers may be used in place of Mighty 100 or Mighty 150 to disperse the silica fume in the mixture. Amounts between 0.25 and 1.5% by weight have proven beneficial and a particularly preferred amount is about 0.47% by weight.

(d) Antifoaming Agent

The composite produced from the above admixture is improved by the incorporation of an antifoaming agent, Tri-n-butyl phosphate being the preferred additive, the purpose of which is to reduce the amount and size of air pockets created or trapped in the final cementitious composite material which would decrease the physical properties. The amount of antifoam agent in the mixture should be between 0.01 and 0.5% by weight and 0.01% by weight is a preferred amount.

(e) Fine Aggregate

The mixture also includes a fine aggregate, preferably Minusil. Minusil is a crystalline silica—and consists of finely divided—generally finer than 5 micron size particles of quartz or silica. Amounts between 5 and 20% by weight have been used with excellent results at 11.82% which is a preferred amount. The Minusil appears to increase the density of the product and to increase the strength.

(f) Stainless Steel Particles

An essential constituent of the cementitious composite material is a metal aggregate which enhances thermal conductivity and increases the density of the product. The preferred metal aggregate is a mixture of stainless steel particles which are irregular in shape and which are shown in FIG. 1 which is a photograph of this material. Mixtures of various sizes of particles have been tried and a mixture of 10/25 mesh (U.S. Standard Sieve Sizes) and 80/100 mesh (U.S. Standard Sieve Sizes) particles in appropriate proportions has been found to compact well and to produce a composition with optimum strength and thermal chacteristics. Mixtures prepared to include 100/200 mesh (U.S. Standard Sieve Sizes) stainless steel particles were found to be too heavy and did not readily mix uniformly into the mixture nor did they yield the desired combination of thermal properties. The preferred stainless steel powders are sold as Ancor 316L by Hoeganaes Corporation and are Type 316 Ni-Cr-Mo stainless steel particles having less then 0.03% C. They have a density of 6.8 g/cm³. While a variety of combinations of stainless steel particles coarser than 100/200 mesh have been found useful, a particular preferred mixture is 10/25 mesh—34.77% and 80/100 mesh—18.68%, these being percentages of the total weight of the mixture.

(g) Water

Water, preferably distilled water, is the final constituent of the mixture required to produce the high strength composite of this invention. In order to obtain a product with the desired properties between 5 and 10% of water is added, the preferred amount being 6.66%.

Table I gives a range of preferred proportions of the several ingredients in the mixture from which the composite is produced.

TABLE I

| | (In % By Weight) | |
|---|---|---|
| | Range | Preferred |
| Portland Cement | 20 To 33 | 24.28 |
| Active Condensed Silica Fume | 2 To 7 | 3.31 |
| Water | 5 To 10 | 6.66 |
| Superplasticizer | 0.25 To 1.5 | 0.47 |
| Antifoam Agent | 0.01 To 0.5 | 0.01 |
| Fine Aggregate | 5 To 25 | 11.82 |
| S/S-10/25 Mesh | Up To 50 | 34.77 |
| S/S-80/100 Mesh | Up To 30 | 18.68 |

Preparation of the Mix

The mix is prepared generally in accordance with ASTM Procedure C 305 for Mechanical Mixing of Hydraulic Cements (Part 5) as may be seen from the following example in which the order of addition and proportions are believed to be essential in order to obtain the desired properties.

The mixture was prepared in a mixing bowl equipped with a planetary action paddle mixer (Hobart mixer—ASTM Standard C-305-80) by adding 169 parts by weight of water containing 12 parts by weight of the superplasticizer and 0.64 parts of Tri-n-butyl Phosphate to a blend of 616 parts Class H Portland cement to which 300 parts Minusil have been added. Then 84 parts by weight of the chemically active condensed silica fume was added with mixing.

Finally, the metal aggregate was added to complete the formulation. The metal aggregate comprises a mixture of two or more different sizes of stainless steel powder. A preferred mixture consists of 882 parts by weight of 10/25 mesh size and 474 parts by weight of 80/100 mesh size which have been mixed together, dry, to produce the metal aggregate. The entire batch is mixed to blend the constituents.

The resulting mixture was placed into a brass mold and permitted to cure in a moist box for 24 hours at room temperature, then it was steam cured at 60 degrees centigrade for twenty four hours. The result is a composite which possesses the desired combination of properties described below and which retains these properties after several thermal cycles, as it could encounter in certain uses.

The desired properties include (1) vacuum integrity; (2) a low coefficient of expansion; and (3) adequate mechanical strength.

Because of the use of the several aggregates with distinctly different shapes and sizes a material is produced which is free of macroscopic pores and exhibits a higher thermal conductivity than the usual cementitious materials.

Figure 2:
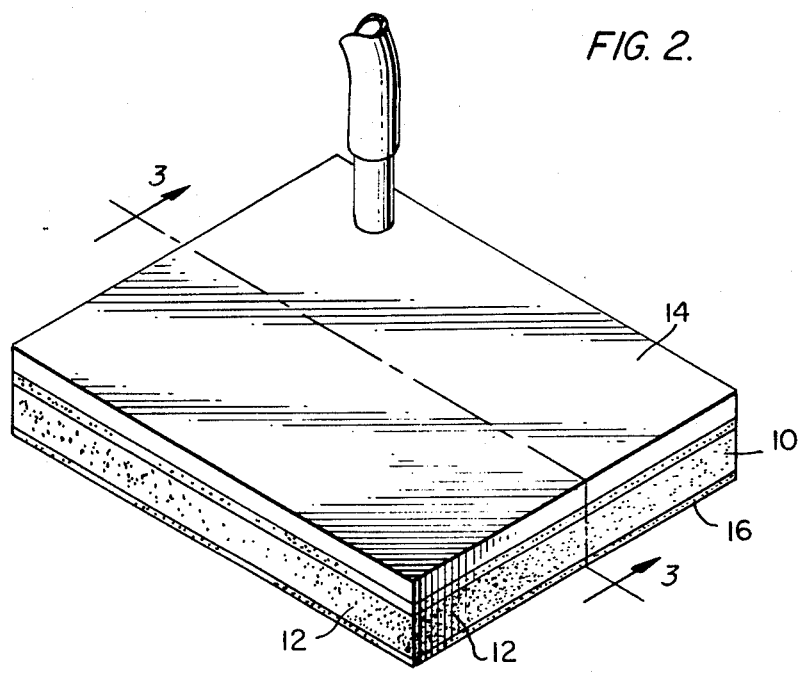
FIG. 2 is a diagrammatic view of an apparatus for testing the vacuum integrity of the composite material after it has been cast as a block.
Figure 3:
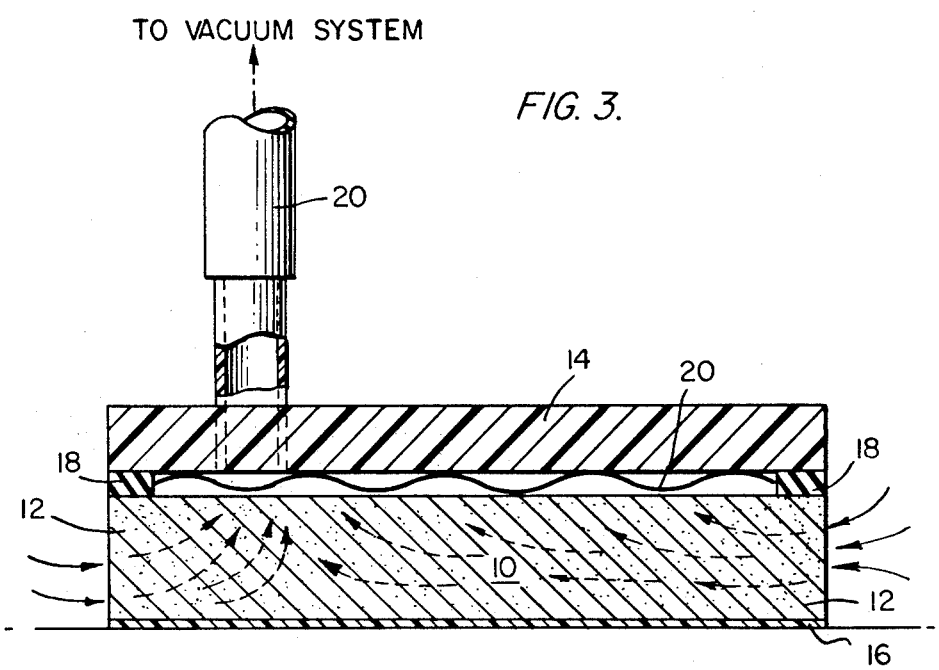
FIG. 3 is a schematic view, partly in section, taken through plane 2—2 of FIG. 2.

The vacuum integrity of the product was determined by casting a block of the same and measuring its porosity after it had been cured, using the apparatus shown in FIGS. 2 and 3. FIGS. 2 and 3 show schematically the setup for testing the leak rate through the sides of the test piece and through the bottom of the test piece respectively.

Shown in FIG. 2 is the apparatus for testing the vacuum integrity of a test block cast from the previously described compositions comprising (1) means to confine the test block between members which seal off one or more surfaces of the block and which leave one or more surfaces exposed to the surrounding atmosphere and (2) means operatively connected to the confining means to apply a vacuum to the block.

In FIGS. 2 and 3 a test block (10) is shown with apparatus for measuring the leak rate through the four side faces (12) of the block. Before the vacuum plate (14) is applied to the block, the bottom of block (10) is coated with a thin layer of a silicone rubber composite to seal the bottom of the block and a coat (16) of epoxy may be painted over the silicone rubber to further insure that the bottom of the block is sealed. A silicone sealant (18) is then applied to the top of the block as strips along the perimeter of the top surface. A piece of cloth (20) is then laid on top of the test block, and then vacuum plate (14) is placed on the block. A hose (21) connects a fitting on vacuum plate to a source of vacuum (not shown). Means for measuring the leak rate into the block through the exposed edges are operatively connected to the test apparatus.

Figure 4:
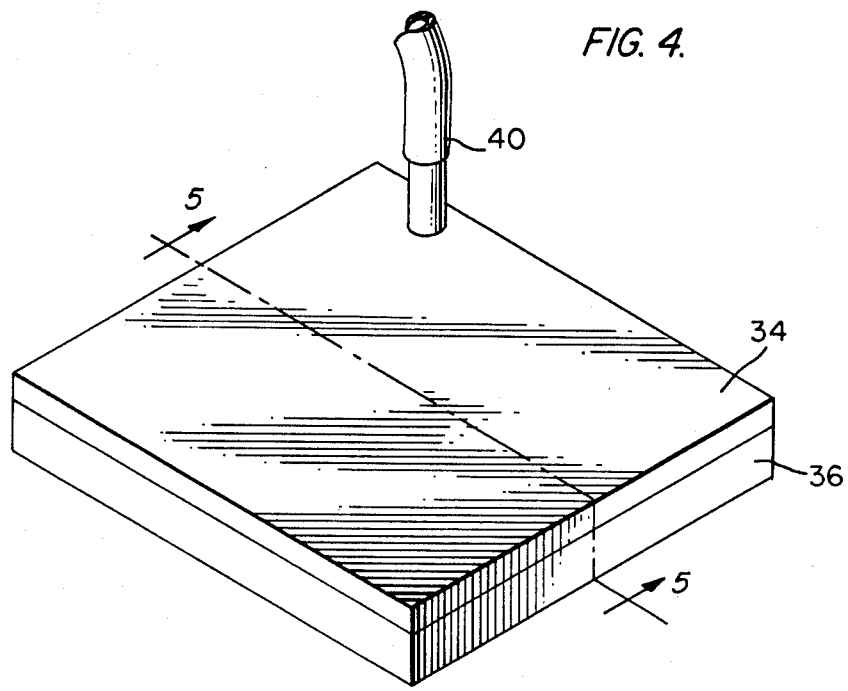
FIG. 4 is a view similar to FIG. 2 except that the vacuum integrity of the test piece is measured through the bottom face of the test block rather that through an edge surface as in FIGS. 2 and 3.
Figure 5:
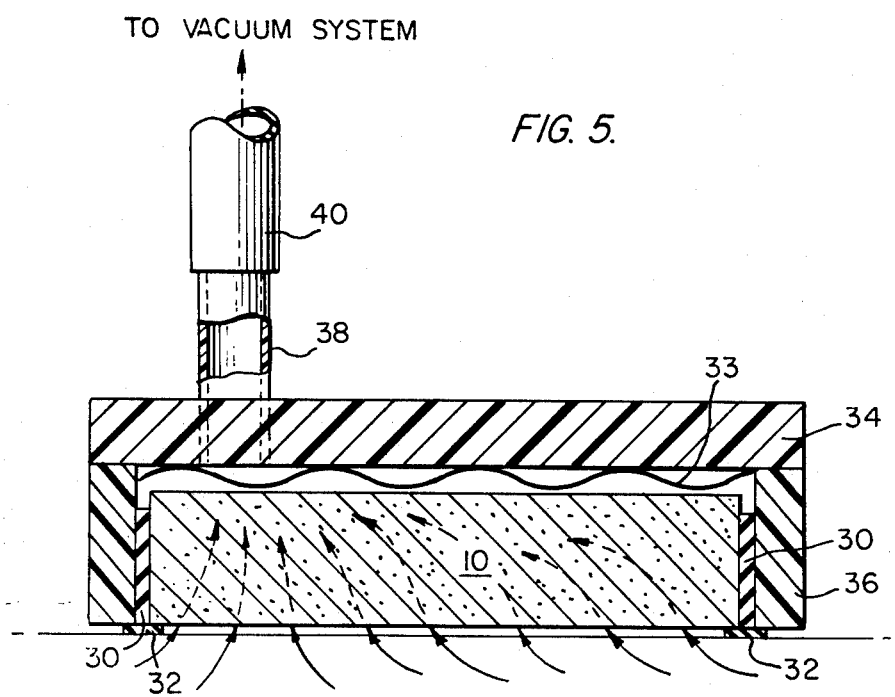
FIG. 5 is a schematic view partly in section of the apparatus of FIG. 4 taken on plane 4—4.

FIGS. 4 and 5 show the apparatus as it is modified to test the leak rate through the base of the test block. In these Figures, the edges of the block (10) are sealed with a silicone sealant (30) which is then covered by a tape (32) to insure that the edges are sealed. A piece of cloth (33) is placed on the top of the test block and then the vacuum apparatus (14) comprising a top engaging plate (34) and side engaging plates (36) is placed on the so-prepared test block (10), so as to enclose all but the bottom surface of the block. Plate (34) is equipped with a fitting (38) which is connected to hose (40) which in turn is connected to a source of vacuum. In this test, the leak rate through the bottom surface is measured.

TABLE II

| Vacuum Integrity (Torr/Hr/Area) | | |
|---|---|---|
| | Ordinary Cement/ Sand Mortar | This Invention |
| Bottom | 120 | 6 |
| Sides | 120 | 10 |

The thermal properties of the new material of this invention which were determined by standard tests may be seen from TABLE III below which sets forth the properties of material which has been cured, steam cured, and then cycled one or more times as follows:

TABLE III

| Thermal Properties | | | |
|---|---|---|---|
| Thermal Conductivity: | | | |
| Temperature | | Thermal Conductivity | |
| C. | F. | W/mK | BTU IN/HR FT$^2$ F. |
| #1  24 | 75 | 2.60 | 18.0 |
| 121 | 250 | 2.71 | 18.8 |
| #2  24 | 75 | 1.90 | 13.2 |
| 121 | 250 | 2.51 | 17.4 |
| 204 | 400 | 2.5 | 17.3 |
| 315 | 600 | 2.31 | 16.0 |
| 121 | 250 | 2.01 | 13.9 |

| Specific Heat: | | | |
|---|---|---|---|
| Temperature | | Specific Heat | |
| C. | F. | J/kg C. | CAL/G C. |
| 24 | 75 | 760 | .181 |
| 121 | 250 | 800 | .191 |
| 204 | 400 | 845 | .202 |
| 280 | 530 | 1150 | .275 |

Thermal Expansion:

TABLE III-continued

| Thermal Properties | | | |
|---|---|---|---|
| Temperature | | Total | |
| C. | F. | Expansion | C.° Coefficient |
| 25 | 75 | 0 | — |
| 125 | 257 | 13.3 × 10$^{-4}$ | 13.3 × 10$^{-6}$ |
| 200 | 392 | 21.6 × 10$^{-4}$ | 12.3 × 10$^{-6}$ |
| 300 | 575 | 30.8 × 10$^{-4}$ | 11.2 × 10$^{-6}$ |

The mechanical properties are shown in TABLE IV below.

TABLE IV

| MECHANICAL PROPERTIES | |
|---|---|
| Density | 220 LB/FT$^3$ |
| Compressive Strength* | 30,880 psi |
| Tensile Strength* | 2,180 psi |
| Flexural Strength* | 3,680 psi |

*5 Day Cure: 24 Hours in 140° F., 95 + % RH, followed by 5 thermal cycles (45 minutes up, 45 minutes residence, 45 minutes down; RT-400° F.-RT)

We claim:

1. A cementitious composite material which comprises Portland cement and irregularly shaped stainless steel particles as the principal filler.

2. A cementitious composite material which comprises Portland cement and irregularly shaped stainless steel particles as the principal filler and which is capable of holding a vacuum.

3. The material of claim 2 having a thermal conductivity of between about 13 and about 19 BTU-/IN/HR/Ft$^2$/°F., a specific heat of between about 0.18 and 0.28 cal/G/°C. and a coefficient of thermal expansion between about 12 and 13.5×10$^{-6}$/°K.

4. A mixture from which objects of a cementitious composite material may be cast, which exhibits high strength and vacuum integrity, said mixture comprising:
 a. Portland cement
 b. chemically active silica fume particles
 c. a less chemically active siliceous fine aggregate
 d. a superplasticizer
 e. an antifoam agent
 f. an irregularly shaped stainless steel particulate, filler and
 g. water.

5. The mixture of claim 4 in which the constituents are present in the following relative proportions in % by weight of the mixture:
 a. Portland cement—20-33%
 b. chemically active silica fume—2-7%
 c. less active fine aggregates—5-25%
 d. superplasticizer—0.01-1.5%
 e. antifoam agent—0.01-0.5%
 f. metallic filler—
  10/25 mesh stainless steel up to 50%
  80/100 mesh stainless steel up to 30%; and
 g. water—5-10%.

6. The mixture of claim 5 in which the relative proportions are approximately:
 a. Portland cement—24-25%
 b. chemically active silica fume—3-3.5%
 c. less active fine aggregate—10-12%
 d. superplasticizer—0.5%
 e. antifoam agent—0.25%
 f. metallic filler—
  10/25 mesh stainless steel up to 35%
  80/100 mesh stainless steel up to 20%; and
 g. water—6-7%.

7. The mixture of claim 6 in which the relative proportions are approximately:
   a. Portland cement—24.28%
   b. chemically active silica fume—3.31%
   c. less active fine aggregate—11.82%
   d. superplasticizer—0.47%
   e. antifoam agent—0.01%
   f. metallic filler—
      10/25 mesh stainless steel 34.8%
      80/100 mesh stainless steel 18.7%; and
   g. water—6.66%.

8. The mixture of claim 7 in which the Portland cement is API Class H.

9. The mixture of claim 5 in which the superplasticizer is sodium salt of formaldehyde condensate of naphthalene beta sulfonic acid.

10. The mixture of claim 5 in which the antifoam agent is Tri-n-butyl phosphate.

11. The mixture of claim 5 in which the irregularly shaped metallic filler is type 316 stainless steel particles.

12. The mixture of claim 5 in which the less active siliceous aggregate comprises particles of quartz or silica finer than 5 microns.

13. A method of preparing cast objects of a cementitious composite material with high strength, vacuum integrity and good thermal properties and which are characterized by an absence of a continuous network of interconnected pores which comprises:
   a. preparing a blend of Portland cement and fine crystalline silica particles in a mixing vessel
   b. adding superplasticizer and an antifoam agent to produce a mixture thereof
   c. adding said mixture to said blend in said vessel, with stirring
   d. preparing a mixture of at least two different size fractions of stainless steel particles
   e. mixing said mixture of stainless steel particles into the contents of the mixing vessel; and
   f. casting the resulting material into an object.

14. A cementitious object with high strength, vacuum integrity and good thermal properties prepared by the method of claim 13.

15. A cementitious object with vacuum integrity produced from the mixture of claim 5.

* * * * *